US005338615A

United States Patent [19]

Quick et al.

[11] Patent Number: 5,338,615

[45] Date of Patent: * Aug. 16, 1994

[54] THIN GENUINE GOLD SIGN MAKING FILM

[75] Inventors: Charles E. Quick; Jamie R. Quick, both of Middletown, N.Y.

[73] Assignee: Signgold Corporation, Middletown, N.Y.

[ * ] Notice: The portion of the term of this patent subsequent to Aug. 31, 2010 has been disclaimed.

[21] Appl. No.: 54,525

[22] Filed: Apr. 28, 1993

Related U.S. Application Data

[63] Continuation-in-part of Ser. No. 946,396, Sep. 17, 1992, Pat. No. 5,240,778.

[51] Int. Cl.[5] .................... B32B 9/00

[52] U.S. Cl. .................... 428/457; 428/40; 428/41; 428/42; 428/43; 428/914; 156/233; 156/240; 156/241

[58] Field of Search .................... 428/457, 40, 41, 43, 428/42, 914; 156/233, 240, 241

[56] References Cited

U.S. PATENT DOCUMENTS

| | | | |
|---|---|---|---|
| 4,720,315 | 1/1988 | Greenman | 156/233 |
| 4,834,276 | 5/1989 | Logan | 226/76 |
| 4,895,287 | 1/1990 | Wood et al. | 226/76 |
| 5,240,778 | 8/1993 | Quick et al. | 428/457 |

*Primary Examiner*—Patrick J. Ryan
*Assistant Examiner*—Abraham Bahta
*Attorney, Agent, or Firm*—Alfred W. Walker

[57] ABSTRACT

A flexible multi-layered transfer film medium for computer-aided sign-making is provided in which the letter or graphic making medium is genuine gold film. The genuine gold film is highly fade resistant in use due to its natural resistance to attack by ultra violet light. The genuine gold film will not fade under normal exposure to UV light for long periods of time. The genuine gold film is to be cut using a computer-aided sign making system.

5 Claims, 1 Drawing Sheet

THIN GENUINE GOLD SIGN MAKING FILM

This application is a continuation-in-part of pending U.S. application Ser. No. 07/946,396, filed Sept. 17, 1992 now U.S. Pat. No. 5,240,778.

FIELD OF THE INVENTION

The present invention relates to durable, thin, but flexible sign-making films which provide metallic gold as the reflective sign lettering and graphics. The films are ultra violet [UV] fade-resistant in use and are easy to cut on computer-aided sign making systems [CASS] and are also easy to manipulate during the sign making process. Thus, the genuine gold film of the present invention is ideal for outdoor use because the genuine gold is colorfast and fade resistant.

BACKGROUND OF THE INVENTION

In contrast, the prior art graphic sign-making has not been capable of producing a product using CASS where the signs employ genuine gold and have stable color and appearance characteristics when subjected to UV in typical outdoor applications. The layered film of the present invention can be cut and adhered to the substrate to be decorated, and this process occurs at room temperature.

The conventional art in modern use employs vinyl films impregnated with organic pigments or dyes, and these are used with release coated materials where transfer tapes are required for the sign making process. The conventional organic pigments suffer from the defect that they are not suitable for outdoor use because the dyes and pigments are subject to attack and degradation by ultra violet light. In contrast, the present invention employs a thin layer of genuine gold in a sign legend suited to outdoor use because genuine gold is impervious to attack by ultraviolet light.

The central novelty of the present invention is to employ genuine gold in a release coated film material for use with transfer tape, and to produce the sign legend pattern by using a computer-aided sign making system. In addition, the genuine gold of the present invention is vapor deposited and is only about 300 Angstroms thick. Because it is vapor deposited, the genuine gold of the present invention is completely uniform in thickness. Because the genuine gold of the present invention is only from about 100 to about 300 angstroms thick, far less genuine gold is needed to manufacture it, thus making the present invention very inexpensive compared to traditional genuine gold signs.

Furthermore, the present invention makes use of an opaque layer which, like the genuine gold layer, is vapor deposited metal, albeit not gold. Preferably, the present invention uses vapor deposited nickel as the opaque layer, and preferably from about 300 to about 1200 angstroms in thickness. The function and placement of the opaque vapor-deposited metal layer will be more fully described below.

In contrast to the room temperature sign-making process of the present invention, at least one prior art process, U.S. Pat. No. 4,855,171 of McKie, employs a film laminate requiring pressure and heat to cause successful image transfer and adherence to an intended substrate.

Various other attempts have been made to provide thin film transfer materials for sign-making. For example, traditionally, "genuine gold gilding" employs the technique of hammering genuine gold in a leather mold to impress it in wafer-thin sheets upon a transfer medium, such as paper sheets. The wafer-thin gold leaf sheets are packaged into books. The present invention is a vast improvement over traditional gilding. Traditional gold-edge gilding requires enormous artistic skill and experience, as well as the use of volatile organic chemicals (VOCs) for proper application. Traditional gilding is also very time consuming and therefore expensive. In contrast, the present invention is quick, accurate, reliable, inexpensive, and does not involve a requirement for artistic skill or the use of VOCs.

Furthermore, traditional genuine gold gilding is done completely by hand, whereas the present invention is completely automated. Traditional gold leaf for gilding is usually available in pieces which are 3.5 inches square, requiring the use of hand-application of numerous individual sheets for any particular job. In contrast, the present invention is capable of being manufactured in a roll according to the standard web-width of 15 inches for computer-aided sign making systems. The rolls can be 2,500 feet in length. Compared to the 3.5 inch square sheet of traditional gold leaf, the automation of the present invention renders it a very significant modern advance over and above the traditional genuine gold gilding process.

Among other prior art patents concerning decorative films include U.S. Pat. No. 4,994,131, which discloses a process of preparing decorative material utilizing transfer print foils; U.S. Pat. No. 5,017,255 which discloses a method of transferring an inorganic image; U.S. Pat. No. 4,867,827 which discloses a process for gold foil stamping that employs gold foil in a printing process; U.S. Pat. No. 4,720,315 discloses a method for preparing a selectively decorated resin film; and U.S. Pat. No. 4,855,171 which discloses transfer films for use in sign making.

Some of these conventional techniques require the use of adhesives to provide an intermediate tacking surface between the intended substrate and the decorative colored dressing to be applied. Such intermediate tacking adhesives are typically comprised of volatile organic compounds (VOC) which evaporate to leave a tacky residue. Such evaporation pollutes the ambient air with VOC molecules. The present invention achieves the desired application of genuine gold to a substrate without using any VOCs at all.

The present invention relates to genuine gold dressing. The present invention uses metallic gold whose purity is at least 22/24 or 22 karat gold. Gold which is 24/24 is 100% pure gold. The term genuine gold is used in the art to refer to gold which is at least 12 karats, i.e., 12/24 or 50% gold metal.

Applying traditional genuine gold leaf in sign making produces a desirable fade-resistant graphic image, but the traditional technique of genuine gold gilding is labor intensive and slow, and requires artistic skill and experience. Traditional gold gilding first requires the manual crushing of gold nuggets into wafer thin gold leaf. The gilder then applies the wafer thin gold leaf using a soft brush. In addition, VOCs are required to tack the wafer thin gold leaf to the substrate.

In contrast, the present invention is accurate, quick, convenient, and relatively non-labor intensive due to the use of computer-aided sign making systems [CASS], and does not employ VOCs, yet produces a graphic image of genuine gold comparable to that of traditional gilding. Thus, the present invention has the advantageous image quality found in genuine gold gilding, but without the drawbacks of high cost, required use of VOCs and a requirement that the invention be practiced by artisans with a high level of artistic skill.

One approach to manufacturing signs is to cut the desired sign letter or graphic from a film stock material. A number of machines are available in commerce for this purpose. Most notable are those computer-aided sign making machines manufactured by Gerber Scientific Instruments, such as the SIGNMAKER IVB and the GRAPHIX 4B and 4E, GSP SPRINT IIB and SUPERSPRINT Model B machines. Such machines selectively cut through a plastic film layer held via a permanently tacky adhesive to a release coated backing, the cutting being effected under computer control. Such machines enable a letter or graphic to be cut on stock material, whereafter the waste plastic film, i.e., that not constituting part of the letter or graphic, is removed and the letter or graphic can then be applied where desired.

Of the aforementioned patents, U.S. Pat. No. 4,855,171 of McKie provides for a film which has substrate layers and which uses a computer sign-making device to cut and shape the film. McKie uses a dye or a pigment for making the sign lettering or graphics visible through a transparent or translucent structurally supportive sign sheet. However, McKie transfers only a coating to the final desired location of the sign legend—not an entire series of layers encompassing a thin layer of vapor-deposited genuine gold as in the present invention. Unlike the present invention, McKie's sign making process is limited to the making of a reverse image which is applied to a transparent substrate. In contrast, the present invention produces sign legends which are transferable in two alternate modes or embodiments. One such mode is the application of a sign legend which, like McKie, is applied in reverse to a transparent substrate, such as a glass door. The reverse-deposited sign legend image is read through the glass so as to read correctly, i.e., not in reverse alphanumeric configuration. However, unlike McKie, the present invention also has an embodiment in which it may be deposited in right-reading alphanumeric configuration to an opaque substrate.

In further contrast between the present invention and McKie, the dyes and pigments taught by McKie are not metallic in appearance, whereas the genuine gold of the present invention appears metallic because it is genuine metal. Such dyes and pigments are typically comprised of materials which cannot effectively withstand UV exposure. These dyes and pigments are typically used with aluminum particles to impart a partially metallic appearance. When exposure to ultra violet light causes decomposition and deterioration of the dyes and pigments, these signmaking materials typically appear silver in color, due to the aluminum particles which remain unaffected by the UV. For the foregoing reasons, McKie's process cannot produce signs with a metallic appearance which are suitable for outdoor use.

In contrast, the genuine gold film of the present invention is naturally fade-resistant and will not tarnish or rust. Additionally, McKie teaches the adhesion of the film using a heated roller nip, whereas the present invention can be adhered at room temperature. McKie's adhesive is not tacky at room temperature, and requires heat to make it tacky. In contrast, the present invention's adhesives are all tacky at room temperature. As a difference between McKie and the present invention, the use of McKie's heat and pressure is contraindicated for the thin metal substrates such a genuine gold, and would destroy the acrylic pressure-sensitive adhesive of the present invention. In effect, the present invention eliminates the need for McKie's heated roller nip.

Calhoun, U.S. Pat. No. 5,017,255, provides for gold as a coating component, but genuine gold is not used as a durable substrate of a sign making film. In Calhoun, the gold is merely coated onto an embossed substrate and then laminated adhesively. The embossing dictates the pattern image to be transferred. In contrast, the present invention utilizes genuine gold as a layer in a film which can be cut using a computer-aided sign making system to create the sign lettering or graphics. Unlike Calhoun, where embossing is used to create the sign lettering or graphics, the present invention avoids embossing entirely, to create the sign lettering and graphics.

Further, Calhoun applies metal coating in a flat disposition which, unlike the present invention, does not give highly desirable luster and reflectivity over a wide viewing angle.

In contrast, and in order to achieve optimal brilliance and reflectivity, the present invention employs a novel texturing process for the genuine gold and the film layer serving as the substrate for the genuine gold layer. Accordingly, the present invention produces high reflectivity of the genuine gold by applying genuine gold which has been formed into structurally textured surfaces, which are comprised of angularly disposed surfaces, the angularity being produced by embossing the layer which serves as the substrate for the vapor deposited genuine gold. When the graphic image is cut from the film of the present invention, the angularly disposed genuine surfaces reflect light from a wide variety of angles, creating far greater reflectivity of the finished product, as compared to the flat-disposed coating of Calhoun.

In further contrast, the Calhoun coating is deposited upon a substrate and is not permanently bonded. The bond in Calhoun between metal coating and substrate is characterized by contact adhesion.

In the present invention, on the other hand, the genuine gold is vapor deposited and permanently bonded to its substrate.

Calhoun, unlike the present invention, requires an additional adhesive and further substrates for a base. Calhoun prepares his gold coating surfaces so as to be removable—i.e. metal is deposited to be removed. Pressure-sensitive tape is applied only onto metal areas. Further, Calhoun employs embossing—which means that metal coating is applied and then selectively removed to create the pattern.

In contrast, the present invention blankets the substrate by vapor-coating the textured film layer serving as the genuine gold substrate. This vapor deposition creates a permanent bond between the genuine gold and its film substrate layer. The sign lettering or graphics are then created using a computer-aided sign making system [CASS].

Since McKie uses layered substrates with dyes and pigments in a binder material, while Calhoun employs metal coatings, of which gold is an example, one skilled in the graphic arts might at first glance think of substituting the gold coating of Calhoun into the multi-layered computer-cut film of McKie. Aside from the fact that neither McKie nor Calhoun suggest or teach the invention of the other, such a combination could not work.

To begin with, there is no way to adhere the gold coating of Calhoun in the layered film of McKie because McKie's adhesive is not tacky at room temperature. Placing a coating of gold over McKie's adhesive would provided a barrier between the adhesive and the substrate to which the adhesive is intended to stick. Thus, substituting a gold layer as taught by Calhoun into the layered film of McKie would prevent proper adhesion required in McKie's invention.

Furthermore, substituting a thin layer of gold as taught by Calhoun into the invention of McKie would cause a shifting and distortion of the gold upon being subjected to McKie's required heated roller nip. The pressure of the roller nip would cause the extremely thin and pliable gold layer to shift as the McKie adhesive becomes tacky under the elevated McKie temperature. The gold sign legend of a hypothetical Calhoun-McKie combination would thus be impossible to adequately control, due to the shifting of the gold under heat and pressure.

In contrast to McKie, Calhoun, and even to the hypothetical combination of McKie and Calhoun, the present invention uses special adhesives, which do not employ VOCs within the layered film to firmly and permanently attach a thin layer of genuine gold and to then computer-cut the genuine-gold-bearing film to the desired legend pattern. The genuine gold is at all times held within the layered film.

In addition to the foregoing prior art, there is also a well-known commercial system of applying paint containing gold flecks to metallized graphic sign legends, such as made by Arlon Company of Santa Ana, Calif. and Universal Products, Inc. of Goddard, Kans. The paint contains flecks which may be genuine gold or imitation gold in the form of a gold-colored dye or pigment.

As earlier discussed, dyes and pigments cannot withstand ultraviolet light (UV) exposure and therefore cannot be suitable for making outdoor signs. Paint in which gold flecks are incorporated in a slurry will produce a sign with a durable gold legend, but such a sign will contain far more gold than a sign produced with the present invention, which also has a genuine gold outdoor-durable legend. The reason for the present invention's use of far less gold than a system employing genuine gold fleck paint is that the genuine gold layer in the present invention is very thin—preferably about 300 angstroms.

Furthermore, the reflective brilliance of signs produced with the genuine gold fleck paint are inferior to the reflective brilliance of the genuine gold of the present invention due to the textured, angularly adjacent surfaces of the substrate on which the genuine gold is deposited in the present invention. This texturing, as noted elsewhere in this disclosure, provides very superior reflective brilliance from a wide range of viewing angles. In contrast, the signs made with paint containing flecks of gold do not provide nearly as brilliantly reflective surface, because there is far less control over the final surface characteristics of the gold when flecks of it are painted onto a substrate.

In contrast, the present invention applies a genuine gold layer within a textured layered film. Vapor deposition of the genuine gold is accomplished in a vacuum, as is done in the invention of Calhoun. Unlike Calhoun, however, the present invention employs a novel process to produce texturing on the substrate layer on which the genuine gold is vapor deposited. The texturing is accomplished by applying an embossing roller to the film which becomes the genuine gold substrate. The embossing roller produces the desired textured surfaces in angular relationship to each other. When genuine gold is vapor deposited onto those textured angularly-disposed surfaces, the genuine gold is similarly textured and angularly disposed. This angular disposition creates the reflective brilliance of the genuine gold sign legend over a wide range of viewing angles. Such widely viewable brilliance is thus a novel feature of the present invention, as is the embossing-roller texturizing of the substrate film onto which the genuine gold is deposited.

In contrast, Calhoun deposits a gold layer onto an embossed substrate, wherein the gold is then selectively removed by a transfer process. Although Calhoun employs an embossing technique, the layer of sign-legend gold as Calhoun applies it does not have the benefit of an embossed substrate—and thus Calhoun's process lacks the reflective brilliance which characterizes the present invention. Calhoun, unlike the present invention, uses a release transfer material to directly contact and lift the gold layer from selected portions on the embossed surface onto which is has been deposited. This selectively removed gold is then re-deposited in a desired location. Another important difference exemplified by the foregoing comparison of Calhoun and the present invention is that the genuine gold of the present invention is lodged permanently in place upon the substrate film upon vapor deposition. Although the multilayered film system in which the genuine gold of the present invention is cut by a computer-aided sign making system [CASS] the genuine gold is not disturbed by physical contact with a transfer material as it is in the Calhoun process. The pattern of the sign legend is determined in the present invention by cutting the film with a computer-aided sign making system. In contrast, in Calhoun, the pattern of the sign legend is determined by the embossing pattern of the substrate onto which the Calhoun gold is deposited.

The present invention is also unlike the invention of application Ser. No. 07/946,396, of which the present invention is a continuation-in-part. The present invention not only uses vapor deposited metal, preferably nickel, as an opaque layer in both a direct-apply embodiment and in a reverse-apply embodiment, but the present invention is substantially thinner than the prior genuine gold sign making invention. In its direct-application embodiment, my prior genuine gold sign making invention utilized a composite of adhesive and film layers totalling 6.5 mils in thickness. The present invention replaces this 6.5 mil thick composite with a layer of vapor-deposited metal with a maximum thickness of 1200 angstroms. In the reverse-application embodiment, my prior genuine gold sign making invention provided a 4-mil-thick composite of adhesive and film which is now replaced by a vapor deposited metallic layer of maximum 1200 angstrom thickness in the present invention.

Thus, with the present invention being substantially thinner, the present invention has the advantage of being easier to cut on a computer aided signmaking machine, where thinner material can be cut more easily, more reliably and with less waste.

As compared to the prior genuine gold sign making invention, the present invention is also cheaper to manufacture. The vapor-deposited metal opaque layer is from about 300 angstroms thick to about 1200 angstroms thick.

OBJECTS OF THE INVENTION

It is an object of the present invention to use genuine gold in sign-making.

It is another object of the present invention to provide genuine gold film sign making materials which are flexible and easily cut on a computer-aided sign making system, and are also fade resistant under exposure to UV radiation when in place as sign lettering or graphics.

It is a further object of the present invention to make genuine gold film signs which are resistant to ultra violet light.

It is yet a further object of the present invention to provide signs which are fade resistant.

It is yet a further object to provide for the elimination of pollutants, such as volatile organic compounds, in the application of genuine gold lettering or graphic images.

It is a further object of the present invention to provide a genuine gold sign making material which is substantially thinner than any prior genuine gold sign making material and which is thus easier to cut on a computer aided sign making machine.

It is a further object of the present invention to provide a genuine gold sign making material which is cheaper to manufacture than any previous genuine gold sign making material.

Other objects and advantages of the present invention will become apparent from the following description of the present invention.

SUMMARY OF THE INVENTION

The present invention employs a thin film substrate system in which is vacuum deposited a metallic opaque layer and in which is vapor deposited a layer of genuine gold. The film has one or more substrate layers in addition to the genuine gold, so that the film remains easy to cut via a computer-aided sign making system.

The present invention has two embodiments, one being for direct application and the other being for reverse application. In the direct application embodiment, the CASS is used to cut the sign making material of the present invention into a legend or graphic which is in proper direct viewing orientation in the form in which it comes from the CASS. The direct-application embodiment is then positioned upon a substrate to be decorated, such as a window, a door, or any surface to be decorated. The surface decorated with the direct application embodiment of the present invention may be opaque or transparent, since the directly applied legend or graphic will be readable when directly applied.

The reverse application embodiment of the present invention produces a legend or graphic which is readable only in reverse. The reverse-readable legend or graphic is then applied to the rear surface of a transparent substrate to be decorated. The substrate must be transparent for the reverse application, since the sign must be viewed through the substrate. The reverse application embodiment is thus useful for decorating such substrates as the inside of a window where the sign is to be viewed from outside the window.

In the preferred embodiment of the direct application embodiment there is first release layer of a release coated film; a second substrate layer of a permanent acrylic adhesive overlaying the base release coated layer; a third layer of vapor deposited metal, preferably nickel, which is from about 300 angstroms thick to about 1200 angstroms thick, the vapor deposited metal opaque layer overlaying the second adhesive layer; a fourth substrate layer of vapor deposited gold from about 100 angstroms thick to about 300 angstroms thick, preferably about 300 angstroms thick; and a fifth layer of flexible transparent film, preferably about 2 mils thick, which has been structurally textured, where the texturing may be done with well known embossing techniques. The texturing permits the vapor-deposited gold to reside within the structural texturing, which texturing provides a multiplicity of surfaces which in turn give the finished sign a highly reflective appearance over a wide range of viewing angles due to the varied angularity of the surfaces of the structural texturing.

In the reverse application embodiment, a release coated film first layer, preferably about 4 mils thick, is adjacent to a three-layered adhesive system, comprising layers two, three and four. Thereafter, in sequence, there is a layer of vapor deposited genuine gold comprising a fifth layer, and then a sixth opaque layer of vapor deposited metal, preferably nickel which may be from about 300 angstroms thick to about 1200 angstroms thick, and preferably about 600 angstroms thick. Next in sequence there is a seventh layer of structurally textured flexible film, preferably about 2 mils thick. The texturing is identical in nature and purpose to the texturing utilized in the direct application embodiment.

Adhesive system layers two three and four are comprised as follows. Layer 2 is a transparent permanent acrylic adhesive, preferably about 2 mils thick. Layer 3 is a transparent flexible film, preferably about $\frac{1}{2}$ mil thick. Layer 4 is a transparent acrylic adhesive, preferably about 2 mils thick.

The thickness of the vapor deposited genuine gold is ideally about 300 Angstrom units thick, preferably 250–300 Angstroms thick, but the thickness may range from 100 to 300 Angstroms in thickness. The flexible film is responsive to pressure and is resilient upon release of pressure. After being cut on a computer-aided sign making system into a desired letter or graphic, the flexible film of the present invention is placed upon the substrate to be decorated.

In both the direct application and reverse application embodiments, the genuine gold sign making material is cut with a CASS to produce a legend or graphic, the base release layer is removed just prior to decoration of the substrate, and the legend or graphic is pressed into position on the substrate at room temperature. The result is that the genuine gold film is transferred to the substrate, leaving the desired letter or graphic durably upon the substrate.

DESCRIPTION OF THE DRAWING

Although characteristic features of the present invention will be particularly pointed out in the Claims, the present invention itself, and the manner in which it may be made and used, may be better understood by referring to the following description, taken in connection with the accompanying drawings, forming a part hereof, wherein like reference numerals refer to parts throughout the view, and in which:

Figure 2:
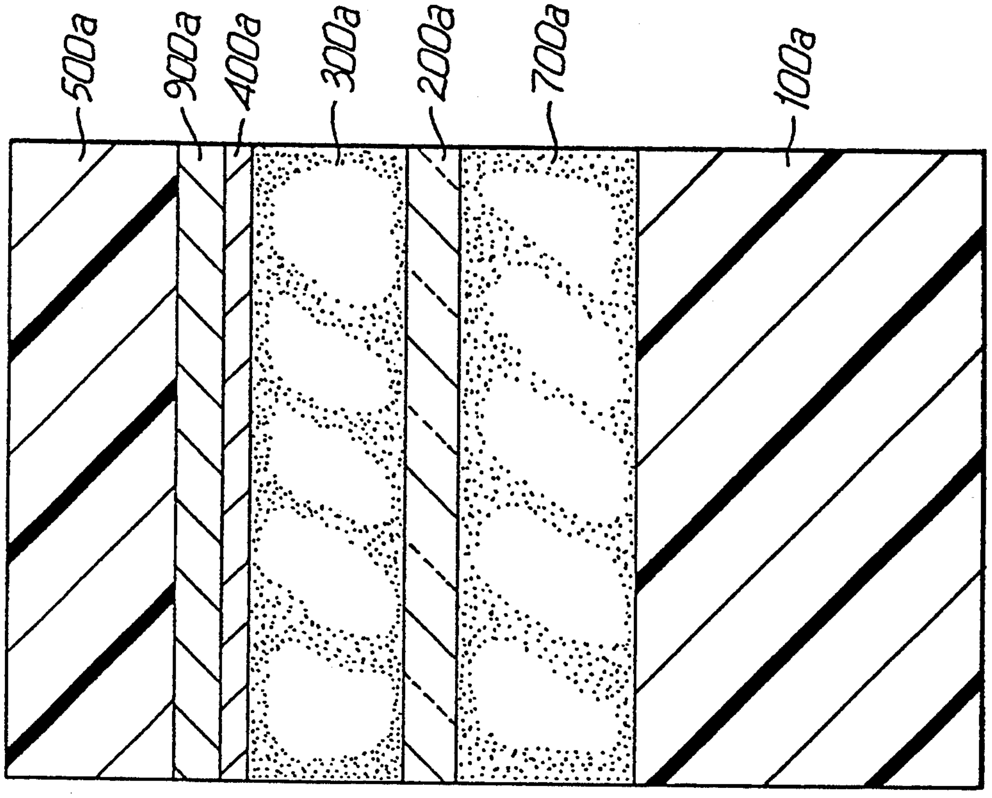
FIG. 2 is a side elevational view of a section of a genuine gold film of the present invention, for reverse application upon one side of a transparent substrate such as a clear window, for viewing from the opposite side of the substrate, requiring the viewer to view the finished sign through the substrate.

For purposes of clarity, the proportions in the drawings are not exactly accurate.

DETAILED DESCRIPTION OF THE PREFERRED EMBODIMENT

Figure 1:
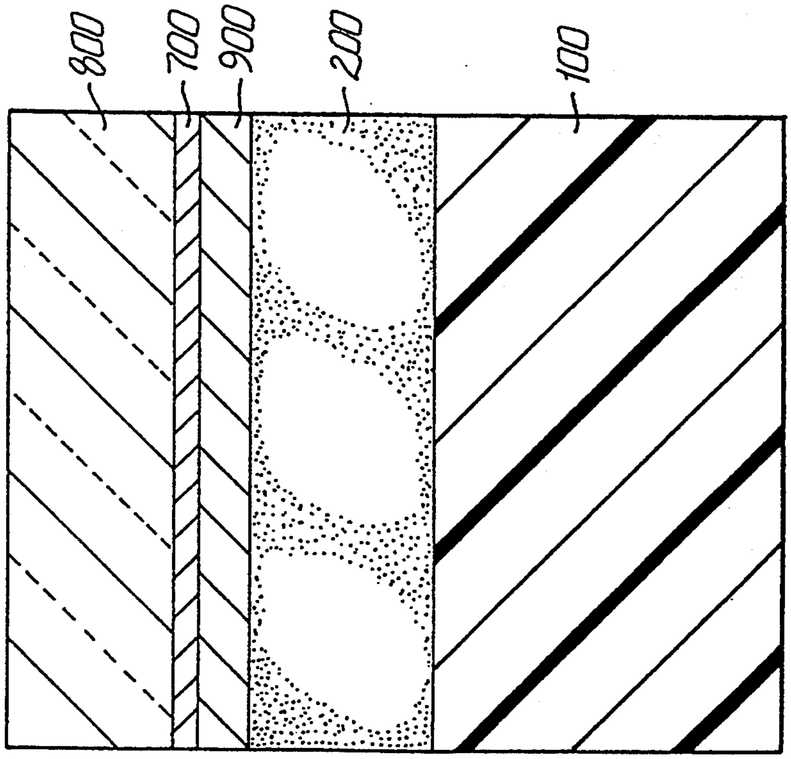
FIG. 1 is a side elevational view of a section of a genuine gold film of the present invention, for direct application upon a substrate which may be opaque, showing in layers the various substrates therein.

Referring to the drawings in detail, there is illustrated in FIG. 1 a preferred embodiment of the present invention in its direct application embodiment. There is a base release layer 10 of a release coated film; a second substrate layer 20 of a permanent acrylic adhesive overlaying the base layer; a third opaque layer 90 of vapor deposited metal, preferably nickel; a fourth substrate layer 70 of a thin coating of vapor deposited genuine gold overlaying the acrylic adhesive layer; and a structurally textured cover layer 80 of a flexible transparent film overlaying the genuine gold layer 70, the aggregate of layers comprising a layered structure comprising a flexible film capable of being cut on a computer-aided sign making system.

FIG. 2 shows the reverse application embodiment. Base release layer 10*a* is adjacent to layers 70*a*, 20*a* and 30*a* in sequence, which sequence comprises an adhesive system for which it is absolutely essential that the system, i.e., layers 70*a*, 20*a* and 30*a*, be free from visual distortion. This means that said system must remain absolutely flat, smooth and transparent in order to ensure the absence of visual distortion. Otherwise, the genuine gold cannot be viewed through these film layers, and through the transparent substrate with crystal clarity.

Continuing in FIG. 2, layer 40*a* is vapor deposited genuine gold, preferably about 300 angstroms thick. Layer 90*a* is opaque for the purpose of visually contrasting with and setting off the genuine gold for maximum visibility and brilliance in the finished sign. Layer 90*a* is vapor deposited metal, preferably nickel, from about 300 to about 1200 angstroms thick and preferably about 600 angstroms thick. Layer 50*a* is structurally textured flexible film, preferably about 2 mils thick.

The present invention is put into practical application by subjecting the film to a computer-aided sign making system, which is a device which sharply and cleanly cuts through the film layers, all layers being through cut except release coated base layer 10, which is not cut. With the cuts having been made, excess film material is removed manually in a process called weeding. Weeding leaves just the desired sign legend adhering to base release layer 10. The adhesive of base release layer 10 is thus carefully adjusted to have sufficient holding power to maintain the integrity of the film before cutting, but to allow the weeding release of excess material in a manner which sharply and cleanly allows removal of excess. With the desired legend material remaining in contact with base release layer 10, a transfer tape is applied to cover layer 80. The transfer tape has an adhesive whose strength has been carefully adjusted to be stronger than the adhesive of release coated layer 10, and so, the transfer tape removes the desired legend pattern from layer 10 when the transfer tape is pulled up and away from layer 10. The transfer tape, bearing the sign legend, is then positioned and manually pressure-adhered at room temperature to an opaque substrate in a desired location. The transfer tape is then removed, its adhesive allowing such removal upon the relatively stronger bonding of the adhesive of layer 20 with the desired opaque substrate. The finished genuine gold sign legend is then finished.

In order to maximize reflectivity off the genuine gold layer 70, layer 80, typically a polyester substrate, is textured by contact with an embossing roller before genuine gold layer 70 is vacuum coated by vapor deposit upon layer 80 into grooves formed by the texturization of layer 80, such that genuine gold layer 70 forms a plurality of facets in angular relationship with each other.

However, in the "reverse configuration" embodiment, as shown in FIG. 2, for use in such applications as attachment to the inside of a clear glass window, the genuine gold layer is designated 40*a*. The sign legend is cut and the layered film is arranged so that the legend is applied in a reverse alphanumeric configuration, for viewing in a normal alphanumeric configuration. In this reverse-image embodiment, it is absolutely essential to ensure that layers 70*a*, 20*a* and 30*a* be free from visual distortion. This means that said system must remain absolutely flat, smooth and transparent in order to ensure the absence of visual distortion. Otherwise, the genuine gold cannot be viewed through these film layers, and through the transparent substrate with crystal clarity.

In this reverse-image embodiment, the layers on the non-viewing side of the genuine gold, project outward from the reverse-decorated substrate in reverse order, such that layer 90*a* provides an opaque background for the genuine gold layer 40*a* in this clear window lettering/graphics reverse application. In the reverse configuration version as shown in FIG. 2, since genuine gold layer 40*a* is viewed through a transparent substrate (glass window), there is no need for a corresponding transparent cover layer, such as transparent cover layer 80 of the opaque backing material application shown in FIG. 1.

Although an illustrative embodiment of the present invention has been described in detail herein with reference to the accompanying drawing, it is understood that the invention is not limited to the precise embodiments shown, and that various modifications may be made therein without departing from the spirit and scope of the invention.

I claim:

1. A genuine gold film substrate layer sign making material which can be cut with a computer-aided sign making system for making signs, comprising:
   - a plurality of substrate layers, such that one of said layers is genuine gold; and
   - said sign making material compiling flexible film for leaving a desired symbol selected from the group consisting of letters or graphics durably fixed in position upon a sign; and wherein
   - said plurality of layers comprises a transparent cover layer for viewing the genuine gold layer in the completed sign; and wherein
   - said genuine gold layer is vapor deposited; and
   - said genuine gold layer is from about 100 to about 300 angstroms thick; and wherein
   - said plurality of layers further includes an opaque layer for visually contrasting with said genuine gold layer and for setting off said genuine gold layer in bold, easily viewed relief; and wherein said opaque layer is disposed within said plurality of layers such that, in the completed sign, said opaque layer is disposed behind said genuine gold layer with respect to a viewer's line of sight; and wherein said opaque layer is comprised of metal and wherein said metal opaque layer is vapor deposited; and wherein said metal opaque vapor deposited layer is from about 300 angstroms in thickness to about 1200 angstroms in thicknesses; and wherein the plurality of layers is bonded upon one another in a multilayered structure, further wherein said plurality of substrate layers is less than 6.5 mils in thickness.

2. The sign making material as in claim 1 wherein the transparent film layer is adjacent to the genuine gold layer is structurally textured to impart a textured appearance to the finished sign.

3. A genuine gold film substrate layer sign making material which can be cut with a computer-aided sign making system for making signs to be viewed from behind a substrate to be decorated, comprising:

a plurality of layers as shown in FIG. 1, wherein the finished sign is to be viewed by a viewer whose line of sight begins at layer 70*a*, the line of view then proceeding upwards in FIG. 2 through layers 20*a* and 30*a* until the line of view intersects genuine gold layer 40*a;* the plurality of layers further having a structured adhesive system comprised of layers 70*a*, 20*a* and 30*a* inclusive, wherein said layers 70*a*, 20*a* and 30*a* are transparent for viewing the genuine gold layer therethrough; and layers 70*a* and 30*a* are comprised of permanent acrylic adhesive; and layer 20*a* is comprised of a transparent film; and layer 40*a* is genuine gold which is vapor deposited and which is from about 100 angstroms to about 300 angstroms thick; and layer 10*a* is a base release liner to be removed when the sign making material is installed as a fixed decoration of a substrate; and wherein layer 90*a* is in contact with genuine gold layer 40*a* and wherein 50*a* is structurally textured to impart a textured appearance to the finished sign; and wherein layer 90*a* is an opaque metal layer and layer 50*a* is comprised of flexible film; and wherein opaque metal layer 90*a* is vapor deposited and is from about 300 angstroms in thickness to about 1200 angstroms in thickness.

4. The metal opaque layer as in claim 1, wherein the metal is nickel.

5. The metal opaque layer as in claim 3, wherein the metal is nickel.

* * * * *